(12) United States Patent
Vegh

(10) Patent No.: US 12,172,847 B2
(45) Date of Patent: Dec. 24, 2024

(54) CONFIGURATION OF A SORTER SYSTEM BASED ON CLOCK CYCLES

(71) Applicant: Intelligrated Headquarters, LLC, Mason, OH (US)

(72) Inventor: Mark Kenneth Vegh, Frederick, MD (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 64 days.

(21) Appl. No.: 18/160,070

(22) Filed: Jan. 26, 2023

(65) Prior Publication Data

US 2023/0174317 A1 Jun. 8, 2023

Related U.S. Application Data

(63) Continuation of application No. 16/860,803, filed on Apr. 28, 2020, now Pat. No. 11,603,270.

(51) Int. Cl.
| | | |
|---|---|---|
| *B65G 43/10* | (2006.01) | |
| *B65G 47/82* | (2006.01) | |
| *G05B 13/04* | (2006.01) | |

(52) U.S. Cl.
CPC ............ *B65G 43/10* (2013.01); *B65G 47/82* (2013.01); *G05B 13/042* (2013.01)

(58) Field of Classification Search
None
See application file for complete search history.

(56) References Cited

U.S. PATENT DOCUMENTS

| | | |
|---|---|---|
| 3,757,942 A | 9/1973 | Gunn |
| 5,588,520 A | 12/1996 | Affaticati et al. |
| 6,236,008 B1 | 5/2001 | Bonnet |
| (Continued) | | |

FOREIGN PATENT DOCUMENTS

| | | |
|---|---|---|
| CN | 102114477 A | 7/2011 |
| CN | 103708210 A | 4/2014 |
| (Continued) | | |

OTHER PUBLICATIONS

CN Notice of Allowance Mailed on Nov. 21, 2023 for CN Application No. 202110336359, 4 page(s).

(Continued)

*Primary Examiner* — Kavel Singh
(74) *Attorney, Agent, or Firm* — Alston & Bird LLP

(57) ABSTRACT

A method for auto-calibration of a sorter is described. The method includes transmitting, by a carrier transmit board of a sorter, a short discharge command to a first section of the sorter. The short discharge command can be generated based on a first clock offset. Further, the method includes receiving at the carrier transmit board a status message indicative of a status of a first motor control board associated with the first section of the sorter. Furthermore, in response to the status message indicating that the first motor control did not receive the short discharge command, the method includes modifying the first clock offset to a second clock offset and retransmitting the short discharge command based on a second clock offset. If the first motor control receives the short discharge command, the method includes configuring a sorter control system based on the first clock offset.

20 Claims, 8 Drawing Sheets

(56) References Cited

U.S. PATENT DOCUMENTS

| | | | | |
|---|---|---|---|---|
| 6,615,091 | B1* | 9/2003 | Birchenough | B65G 37/02 |
| | | | | 700/20 |
| 7,121,398 | B2 | 10/2006 | Affaticati et al. | |
| 7,909,155 | B2* | 3/2011 | Lupton | B65G 43/08 |
| | | | | 198/448 |
| 8,807,320 | B2 | 9/2014 | Fortenbery et al. | |
| 9,150,362 | B2 | 10/2015 | Yegh et al. | |
| 9,309,058 | B2* | 4/2016 | Maglaty | B65G 43/10 |
| 9,422,116 | B1 | 8/2016 | Hase | |
| 10,494,192 | B2* | 12/2019 | DeWitt | B07C 5/36 |
| 10,569,967 | B2* | 2/2020 | Rolfes | G05B 19/41885 |
| 10,577,191 | B2* | 3/2020 | Anderson | B65G 47/52 |
| 11,180,322 | B2* | 11/2021 | Gallati | B65G 19/025 |
| 2003/0136638 | A1 | 7/2003 | Affaticati et al. | |
| 2018/0203438 | A1 | 7/2018 | Henze et al. | |

FOREIGN PATENT DOCUMENTS

| | | | |
|---|---|---|---|
| CN | 107377401 | A | 11/2017 |
| CN | 107750442 | A | 3/2018 |
| EP | 0700844 | A2 | 3/1996 |
| WO | 99/41169 | A1 | 8/1999 |

OTHER PUBLICATIONS

English translation of CN Notice of Allowance dated Nov. 21, 2023 for CN Application No. 202110336359, 3 page(s).
Applicant-Initiated Interview Summary Record (PTOL-413) Mailed on Oct. 13, 2022 for U.S. Appl. No. 16/860,803, 2 page(s).
CN Office Action Mailed on Mar. 28, 2023 for CN Application No. 202110336359, 7 page(s).
English Translation of CN Office Action dated Mar. 28, 2023 for CN Application No. 202110336359, 12 page(s).
European search report and search opinion Mailed on Sep. 2, 2021 for EP Application No. 21168690, 5 page(s).
Non-Final Office Action Mailed on Jul. 12, 2022 for U.S. Appl. No. 16/860,803, 8 page(s).
Notice of Allowance and Fees Due (PTOL-85) Mailed on Oct. 27, 2022 for U.S. Appl. No. 16/860,803, 7 page(s).

* cited by examiner

| | A | B | C | D | E | F | G |
|---|---|---|---|---|---|---|---|
| | CCSid | CURRENT CART OFFSET | CURRENT CLOCK OFFSET | RECOMM. CART OFFSET | RECOMM. CLOCK OFFSET | RECOMM. CART OFFSET | RECOMM. CLOCK OFFSET |
| 257 | 255 | 240 | 10 | 241 | 1 | 241 | 1 |
| 258 | 256 | 241 | 4 | 241 | 9 | 241 | 9 |
| 259 | 257 | 241 | 4 | 242 | 2 | 242 | 2 |
| 260 | 258 | 242 | 0 | 242 | 2 | 242 | 2 |
| 261 | 259 | 242 | 0 | 242 | 2 | 242 | 2 |
| 262 | 260 | 243 | 1 | 243 | 4 | 243 | 4 |
| 263 | 261 | 243 | 6 | 243 | 3 | 243 | 3 |
| 264 | 262 | 243 | 6 | 243 | 9 | 243 | 9 |
| 265 | 263 | 244 | 2 | 243 | 8 | 243 | 8 |
| 266 | 264 | 244 | 2 | 244 | 5 | 244 | 5 |
| 267 | 265 | 245 | 3 | 244 | 5 | 244 | 5 |
| 268 | 266 | 245 | 3 | 245 | 6 | 245 | 6 |
| 269 | 267 | 245 | 8 | 245 | 5 | 245 | 5 |
| 270 | 268 | 245 | 8 | 245 | 11 | 245 | 11 |
| 271 | 269 | 246 | 5 | 246 | 4 | 246 | 4 |
| 272 | 270 | 246 | 5 | 246 | 7 | 246 | 7 |
| 273 | 271 | 247 | 6 | 247 | 7 | 247 | 7 |
| 274 | 272 | 247 | 6 | 247 | 8 | 247 | 8 |
| 275 | 273 | 247 | 1 | 248 | 8 | 248 | 8 |
| 276 | 274 | 247 | 1 | 248 | 1 | 248 | 1 |
| 277 | 275 | 248 | 7 | 248 | 10 | 248 | 10 |
| 278 | 276 | 248 | 7 | 248 | 9 | 248 | 9 |
| 279 | 277 | | | | | | |

FIG. 5

CONFIGURATION OF A SORTER SYSTEM BASED ON CLOCK CYCLES

CROSS-REFERENCE TO RELATED APPLICATIONS

This application is a continuation of and claims priority to U.S. application Ser. No. 16/860,803, entitled "CONFIGURATION OF A SORTER SYSTEM BASED ON CLOCK CYCLES," and filed Apr. 28, 2020, the entirety of which is hereby incorporated by reference.

TECHNOLOGICAL FIELD

Example embodiments described herein relate generally to systems, methods, and apparatuses for configuration of a sorter system based on clock cycles, and, more particularly, to configuration of a sorter control unit of the sorter system based on the clock cycles.

BACKGROUND

Generally, in material handling environments like, but not limited to, distribution centers, warehouses, inventories, or shipping centers, a material handling system, can convey, handle, sort, and organize various type of items (e.g. cartons, cases, containers, shipment boxes, totes, packages, and/or the like) at high speeds. Depending on a configuration of a material handling system, the items may travel through the material handling environment in an unregulated manner (e.g., clustered, partially overlapping, substantially overlapping, and/or non-single file flow) at an initial time or may be repositioned, reoriented, and/or consolidated into a single stream of items, as the items move on conveyors. Some material handling environments include sorters (e.g., tilt-tray sorters, cross-belt sorter, and/or the like) for sorting various items.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Some example embodiments described herein relates to a method for auto-calibration of a sorter. The method includes transmitting, by a carrier transmit board of a sorter, a short discharge command to a first section of the sorter. The short discharge command can be generated based on a first clock offset. Further, the method includes receiving at the carrier transmit board a status message indicative of a status of a first motor control board associated with the first section of the sorter. Furthermore, in response to the status message indicating that the first motor control did not receive the short discharge command, the method includes modifying the first clock offset to a second clock offset and retransmitting the short discharge command based on a second clock offset. Furthermore, in response to the status message indicating that the first motor control received the short discharge command, the method includes configuring a sorter control system of the sorter based on the first clock offset.

In an example embodiment, the short discharge command can be transmitted to the first motor control board associated with the first section of the sorter that is to be actuated for discharging an item. In this regard, according to some examples, the first section of the sorter corresponds to one of: a carrier of a tilt-tray sorter or a cross-belt of a cross belt sorter According to an example embodiment, the short discharge command can be transmitted based on a pre-defined transmit window defined for the carrier transmit board.

In an example embodiment, the method can further include sending an activation command to a plurality of carrier transmit boards of the sorter. Furthermore, the method can include receiving an activation acknowledgement respectively from a set of the carrier transmit boards from amongst the plurality of carrier transmit boards. Furthermore, the method can include activating the set of carrier transmit boards.

According to an example embodiment a step of modifying the first clock offset can include one of: (a) increasing the first clock offset by a first predetermined value and (b) decreasing the first clock offset by a second predetermined value.

A system is described according to some example embodiments. The system can include a processor. The processor can be configured to transmit, by a carrier transmit board of a sorter, a short discharge command to a first section of the sorter. The short discharge command can be generated based on a first clock offset. Further, in response to transmitting of the short discharge command, the processor can be configured to identify a receiving of a status message at the carrier transmit board. In this regard, the status message can be indicative of a status of a first motor control board associated with the first section of the sorter. Furthermore, in response to the status message indicating that the first motor control did not receive the short discharge command, the processor can be configured to, modify the first clock offset to a second clock offset and retransmit, by the carrier transmit board, the short discharge command based on a second clock offset. Furthermore, in response to the status message indicating that the first motor control received the short discharge command, the processor can configure a sorter control system of the sorter based on the first clock offset.

According to an example embodiment, the processor can be configured to further the processor is configured to: send an activation command to a plurality of carrier transmit boards of the sorter. Further the processor can be configured to receive an activation acknowledgement respectively from a set of the carrier transmit boards from amongst the plurality of carrier transmit boards and activate the set of carrier transmit boards.

A sorter system is described according to an example embodiment. The sorter system can include a carrier transmit board and a sorter control unit. The sorter control unit can be communicatively coupled to the carrier transmit board. The sorter control unit can include a processor that can be configured to transmit, by the carrier transmit board, a short discharge command to a first section of a sorter. In this regard, the short discharge command can be generated based on a first clock offset. Further, in response to transmitting of the short discharge command, the processor can be configured to identify a receiving of a status message at the carrier transmit board. In this regard, the status message can be indicative of a status of a first motor control board associated with the first section of the sorter. Furthermore, in response to the status message indicating that the first motor control did not receive the short discharge command, the processor can be configured to modify the first clock offset to a second clock offset and retransmit, by the carrier transmit board, the short discharge command based on a second clock offset. Furthermore, in response to the status message indicating that the first motor control received the short discharge command, the processor can configure a sorter control system of the sorter based on the first clock offset.

In an example embodiment, the sorter system can further include a plurality of motor control boards associated with respective item carrier sections of the sorter. In this regard, the plurality of motor control boards can include the first motor control board.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 5 illustrates an example result set including a plurality of clock offset values identified for configuration of a sorter control system, in accordance with some example embodiments described herein.

DETAILED DESCRIPTION

Figure 1:
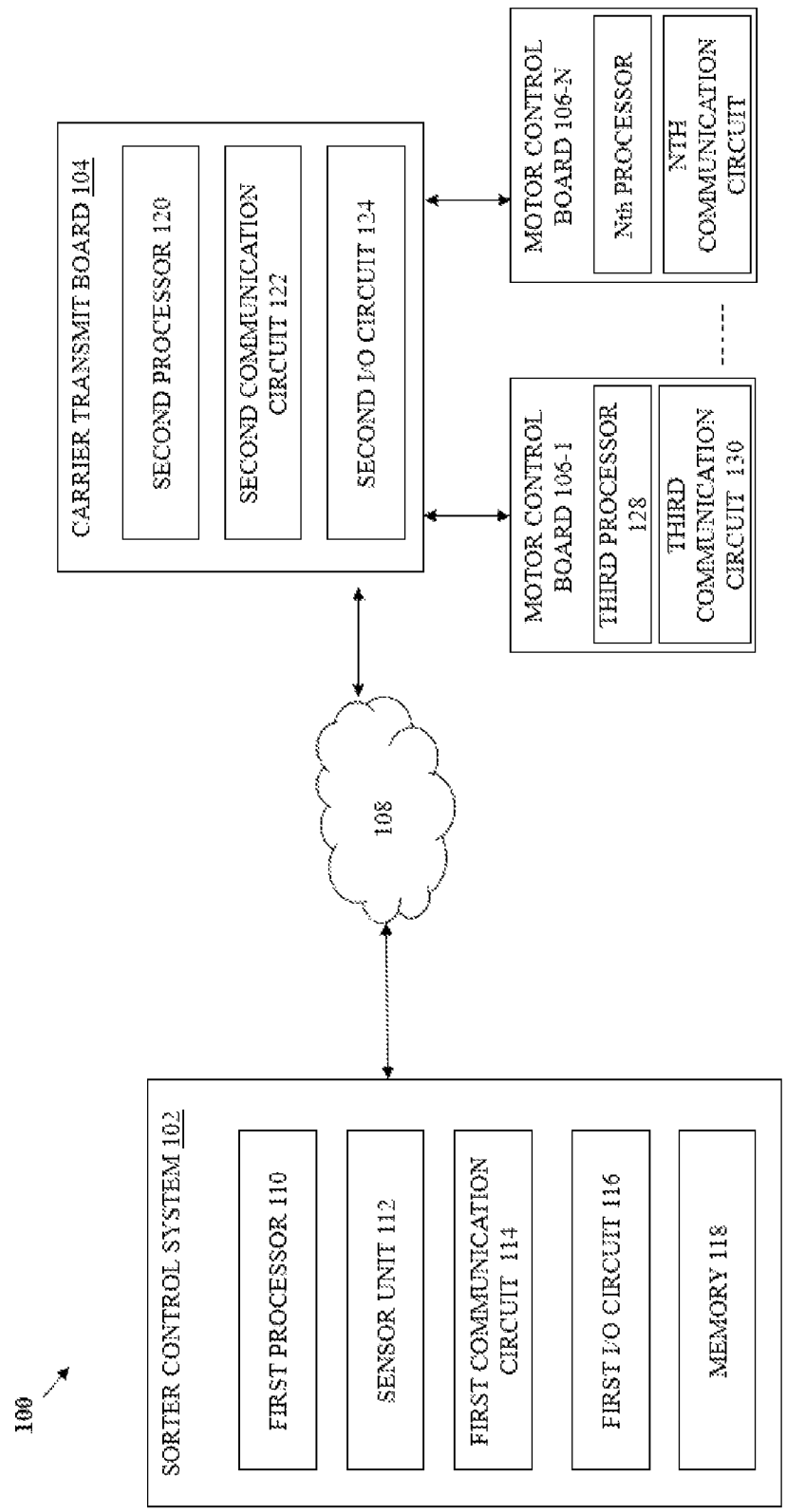
FIG. 1 illustrates a schematic view of a sortation system and various components of the sortation system, in accordance with some example embodiments described herein.

Some embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the disclosure described herein such that embodiments may comprise fewer or more components than those shown in the figures while not departing from the scope of the disclosure.

The term "sorter" or "sortation system" used interchangeably hereinafter can correspond to a sorter (and its associated components) that can be used in a material handling environment for sorting items (e.g. articles, shipments, packages, totes, and/or the like). In some example embodiments the sorter can correspond to any of sorter commonly known in material handling industry, for example, but not limited to, a loop sorter, a tilt-tray sorter, a cross-belt sorter, a narrow belt sorter, a strip belt sorter, a shoe sorter, a sorter diverter, and/or the like.

The "sorter control system" used hereinafter throughout the description can correspond to a controller system that may include one or more of, programmable logic controllers (PLCs), processors, controller, and/or the like that can be used for various purposes like, but not limited to, commanding and controlling operations of various components e.g., but not limited to, carrier transmit boards, motor control boards etc. of a sorter.

Typically, in an installation of a sorter (e.g. a tilt-tray sorter or a cross belt sorter) in a material handling environment, there can be multiple carrier transmitter boards (CTBs) that can be positioned (e.g. mounted) at various locations along the sorter. For example, these CTBs can be mounted nearby an induct or an item discharge chute connected to primary conveyor bed, or at any pre-defined location of the sorter. In some examples, the CTBs can be mounted at dedicated locations along a sorter track of the sorter. Further, these CTBs can be communicatively coupled to a sorter control system that controls operations of the CTBs. Further, the sorter can also include one or more motor control boards (MCBs) associated with a respective section of the sorter. In some examples, these sections of the sorter can correspond to a carrier sections (i.e. sections that carry items) of a tilt tray sorter or a cross-belt section of a cross-belt sorter. For instance, each carrier of a tilt-tray sorter can be referred as a tilt-tray carrier. Similarly, each carrier of a cross-belt sorter can be referred as a cross-belt carrier. Thus, it can be said that the sorter can include multiple carriers and a motor control board can be associated with each carrier of the sorter. In some examples, the motor control board can also be referred as carrier discharge board.

As an example, a tilt-tray sorter can include multiple carriers that can be placed adjacent to each other to form a sorter carrier train, that can run on a conveyor bed of the sorter. In some examples, each of these carriers of a tilt-tray sorter may include a cart and a tray mounted over the cart that can be configured to tilt about an axis to drop an item towards a destination (e.g. an induct or chute). As another example, each of these carriers of a cross-belt sorter can correspond to a cross-belt section of a conveyor belt of the cross-belt sorter that can move in a direction perpendicular to a direction of movement of the conveyor belt. Accordingly, the MCBs can be associated with respective item carrying carriers of the sorter.

Typically, an MCB can be mounted on each cart carrier of the sorter and can control some operations of the cart carrier (e.g. tilting of tray of the cart carrier). In this regard, each MCB associated with the cart can be communicatively coupled to one or more of the CTBs. In some examples, the CTBs can communicate with any MCB of the sorter depending on which carrier is to be actuated for discharging of an item. Said differently, stationary CTBs can be devices which can communicate with the MCBs associated to a respective moving portion of the sorter (e.g. carts and carriers) placed within the sorter track to allow the sorter to function. Further, each MCB can include a processor or a microprocessor that can initiate an action (e.g. tilting of the tilt-tray carrier of the tilt-tray sorter, actuation of a cross-belt section in the cross-belt sorter, induct an item, discharge an item etc.) based on instructions received from the CTB. In this regard, in some examples, a CTB can send a command to the MCB to perform such an action. In some examples, the CTB can send the command to the MCB based on instructions received from the sorter control system of the sorter. In this aspect, commands from the CTB to the MCB are to be transmitted at an appropriate or predefined time period. For instance, in an example, the CTB can send a command to discharge an item to the MCB at an instance of time such that the command gets received at the MCB when a carrier of the MCB is in front of a chute or induct, at which the carrier has to discharge the item. In other words, the command sent the by CTB is to be sent at that predefined instance of time so that the command shall reach the MCB (from amongst multiple MCBs) to which the command is destined. To this end, if the CTB sends the command at inappropriate time interval, it may so happen, that another MCB of another carrier may receive the command can discharge another item which may be undesired.

Accordingly, it may be desired that accurate position of the CTBs of the sorter and/or the MCBs associated with carriers are known at each instance of time during an operation of the sorter. In some examples, a position of each MCB of the sorter is tracked by a sensor unit (also known as a clock pulse unit) of the sorter system. In some examples, the clock pulse unit can include a set of photo eyes that can be used to track movement of the carriers of the sorter. In this regard, the clock pulse unit can operate as a position encoder for encoding positions of one or more of CTBs and/or MCBs of the sorter. In some examples, the sensor unit can be installed at one location on the sorter and can track movement of each carrier of the sorter as the carrier passed through a path monitored using the set of photo eyes. The sensor unit can be a communicatively coupled to a sorter control unit of the sorter control system. Said that, usually, a CTB of the sorter communicates with an MCB based on an estimated distance of the MCB from the CTB. In other words, the CTB sends a command to the MCB based on an estimated position of the carrier to which the MCB is associated. The estimated position of each carrier can be measured in terms of clock cycles measured by the sorter control unit using the sensor unit. In other words, the CTBs computes the distance between the CTB and the MCB based on estimating a location of the MCB in terms of number of clock cycles which the CTB knows about from the sorter control unit.

Usually, the sorter can have any number of CTBs (e.g. 100 CTBs) and several MCBs each associated with a carrier of the sorter. In this regard, a location of a CTB of the sorter is predefined (e.g. fixed positions on sorter track) during an installation of the sorter in a material handling site. In some examples, the position of the CTB can be pre-determined based on considering various factors e.g., but not limited to, a mechanical layout of the sorter, estimated distances of various carts of the sorter from an initial location, location of nearby inducts or chutes etc. In other words, a location of the CTB can be defined by its function. In some examples, the CTB can be placed at a predefined distance from a local device such as, a chute, an induction unit, and/or any other component of material handling system. Said that, the locations at which the CTBs can be mounted along the sorter can be defined in terms of clock cycles from the sorter control unit. Accordingly, during an installation the CTBs can be installed at such predefined locations by an engineer. However, in practicality, due to manual installation and/or due to manufacturing tolerances of sorter track, carriers, carts, unexpected installation site variations, etc., the CTBs may not be appropriately installed at exact locations pre-defined for the sorter control system. This may lead to some errors and inaccuracies in overall calibration of the sorter control unit due to incorrect CTB installation. Further, this may also result in incorrect delivery or receiving of the commands sent by the CTB to the MCBs, and further to inaccurate action (discharging or induction) by the carrier of the sorter. Furthermore, it may also be desired to reconfigure the sorter control system manually by adjusting the positions of CTBs and other components which may be a cumbersome and time-consuming process.

Various example embodiments described herein relates to auto-calibration of the sorter control unit of a sortation system (e.g. a sorter). In some examples, the auto-calibration of the sorter control system, as described herein, can be performed post manual installation of various components e.g. the CTBs of the sorter. According to an example embodiment, a method for auto-calibration of a sorter is described. The method can include transmitting a short discharge command by a carrier transmitter board (CTB) to a first section (e.g. a carrier) of the sorter. The short discharge command can be generated based on a first clock offset. Further, the method can include receiving at the CTB a status message indicative of a status of a first MCB associated with the first section of the sorter. In some examples, the status message may be received in response to the transmission of the short discharge command. In this regard, the status message may indicate if the short discharge command is received or not received, at a motor control board (MCB) to which the short discharge command was transmitted by the CTB. In response to the status message indicating that the first motor control did not receive the short discharge command, the method can include modifying the first clock offset to a second clock offset and retransmitting the short discharge command based on a second clock offset. Furthermore, in response to the status message indicating that the first motor control received the short discharge command, the method includes configuring a sorter control system of the sorter based on the first clock offset. Thus, by way of implementation, the sorter control system can be configured for a clock offset value at which the short discharge command is received at the first MCB, until which, the clock offset value used for generating the short discharge command is modified repeatedly. The clock offset value can be modified till the time, a clock offset value is identified at which the short discharge command gets received at the first MCB. Thus, by modifying the clock offset until the short discharge command is reached at an intended MCB, an accurate clock offset can be identified which can be further used to calibrate the sorter control unit. Further, the sorter control unit can be auto-calibrated based on the accurate clock offset. Further details of the auto-calibration of the sortation system are described in reference to figure description of FIGS. 1-8

FIG. 1 illustrates an exemplary sorter system 100 according to some example embodiments described herein. In an example, the sorter system 100 can be located in a material handling environment. The sorter system 100 can include a sorter (e.g. a tilt-tray sorter or a cross-belt sorter) and/or components associated with the sorter. As illustrated, the sorter system 100 can include a sorter control system 102, at least one CTB 104, and a plurality of MCBs (106-1 . . . 106-N) communicatively coupled over a communication network 108. According to some examples, these components i.e. the sorter control system 102, the at least one CTB 104, and the plurality of MCBs (106-1 . . . 106-N) can be coupled to the sorter. For instance, each motor control board of the plurality of MCBs (106-1 . . . 106-N) can be coupled to a respective carrier or cart of the sorter. Further, in an example embodiment, the CTB 104 can be installed at a pre-defined or dedicated location along installation of the sorter system. In some example embodiments, the sorter system 100 can have more than one CTB 104. For instance, in an example, the sorter system 100 can have a plurality of CTBs (like the CTB 104) that may be installed at various dedicated locations within a material handling environment along the sorter.

In accordance with some example embodiments, the sorter control system can control various operations of the sorter and associated components (like, but not limited to, the CTBs, MCBs, etc.). As illustrated, the sorter control system 102 can include a first processor 110, a sensor unit 112, a first communication circuit 114, a first input/output circuit 116, and a memory 118. The first processor 110 can be communicatively coupled to the sensor unit 112, the first communication circuit 114, the first input/output circuit 116, and the memory 118.

In some examples, the sensor unit 112 can correspond to a clock pulse unit that may include sensors e.g. one or more photo eyes that can be configured to detect one or more carriers of the sorter, as the carriers passes through a section in front of the clock pulse unit, details of which are later described in reference to FIG. 6.

Illustratively, the CTB 104 can include a second processor 120, a second communication circuit 122, and a second input/output circuit 124. The second processor 120 can be communicatively coupled to the second communication circuit 122 and the second input/output circuit 124. Further details related to functioning and operations of the CTB of the sorter system 100 are described in reference to FIGS. 2-8.

As illustrated, the sorter control system 102, the CTB 104, and the MCBs (106-1 . . . 106-N) can be communicatively coupled over the communication network 108. The communication network 108, in some example embodiments can correspond to a medium through which commands and messages can flow amongst the various components of the system 100. In some example embodiments, the communication network 108 may correspond to a wired network. In some example embodiments, the communication network 108 can correspond to wireless network. According to some example embodiments, the CTB 104 can be configured to communicate with the plurality of MCBs (106-1 . . . 106-N) using an Infra-Red (IR) frequency-based network.

In some example embodiments, the communication network 108 can include, but are not limited to, a Wireless Fidelity (Wi-Fi) network, a Piconet, a Personal Area Network (PAN), Zigbee, and a Scatternet. In some examples, the communication network 108 may correspond to a short range wireless network through which the components may communicate with each other using one or more communication protocols such as, but not limited to, Wi-Fi, Radio frequency based network, Bluetooth, Bluetooth low energy (BLE), Zigbee, and Z-Wave. In some examples, the communication network 108 can correspond to a network in which the components may communicate with each other using other various wired and wireless communication protocols such as Transmission Control Protocol and Internet Protocol (TCP/IP), User Datagram Protocol (UDP), and 2G, 3G, or 4G communication protocols. In some examples, the communication network 108 can correspond to any communication network such as, but not limited to, LORA, cellular (NB IoT, LTE-M, Leaky Feeder Coax, etc.)

According to some example embodiments, the processor (e.g. the first processor 110, the second processor 120 etc.) referred herein, can correspond to any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, the processor can refer to an integrated circuit, an application-specific integrated circuit (ASIC), a digital signal processor (DSP), a field-programmable gate array (FPGA), a programmable logic controller (PLC), a complex programmable logic device (CPLD), a discrete gate or transistor logic, discrete hardware components, or any combination thereof designed to perform the functions described herein. In some examples, the processor can also exploit Nano-scale architectures such as, but not limited to, molecular and quantum-dot based transistors, switches and gates, in order to optimize space usage or enhance performance of user equipment.

Further, the communication circuit (e.g. the first communication circuit 114, the second communication circuit 122, the third communication circuit 130 etc.) referred herein, may refer to a circuitry that can be configured to receive and/or transmit data from/to a network and/or any other device, circuitry, or module in communication over the communication network 108. To this end, in some example embodiments, the communications circuit referred herein, may be any means such as a device or circuitry embodied in either hardware or a combination of hardware and software associated with the respective component of the sorter system 100. In some examples, the communications circuit may comprise a network interface for enabling communications with a wired or wireless communication network. For example, the communications circuit may comprise one or more network interface cards, antennae, buses, switches, routers, modems, and supporting hardware and/or software, or any other device suitable for enabling communications via the communication network 108. Additionally, or alternatively, the communications circuit may comprise the circuitry for interacting with the antenna(s) to cause transmission of signals via the antenna(s) or to handle receipt of signals received via the antenna(s). These signals may be transmitted by any of the components of the sorter system 100 and/or the processor over the communication network 108, using a number of wireless personal area network (PAN) technologies, such as, but not limited to, Bluetooth® v1.0 through v3.0, Bluetooth Low Energy (BLE), infrared wireless (e.g., IrDA), ultra-wideband (UWB), induction wireless transmission, and/or the like or via a wired communication technology, such as a data field bus, cables etc.

In some example embodiments, the I/O circuit (e.g. the first I/O circuit 114, the second I/O circuit 124 etc.) may, in turn, be in communication with the processor to provide output to a user and, in some embodiments, to receive an indication of user input. The I/O circuit may comprise a user interface and may comprise a display that may comprise a web user interface, a mobile application, a client device, and/or the like. In some embodiments, the I/O circuit may also comprise a keypad, a joystick, a touch screen, touch areas, soft keys, a microphone, a speaker, or other input/output mechanisms. In some examples, the processor and/or a user interface circuit comprising a processor associated with the I/O circuit may be configured to control one or more functions of one or more user interface elements associated with the I/O circuit through computer program instructions (e.g., software and/or firmware) stored on the memory (e.g. the memory 118) accessible to the processor.

Figure 2:
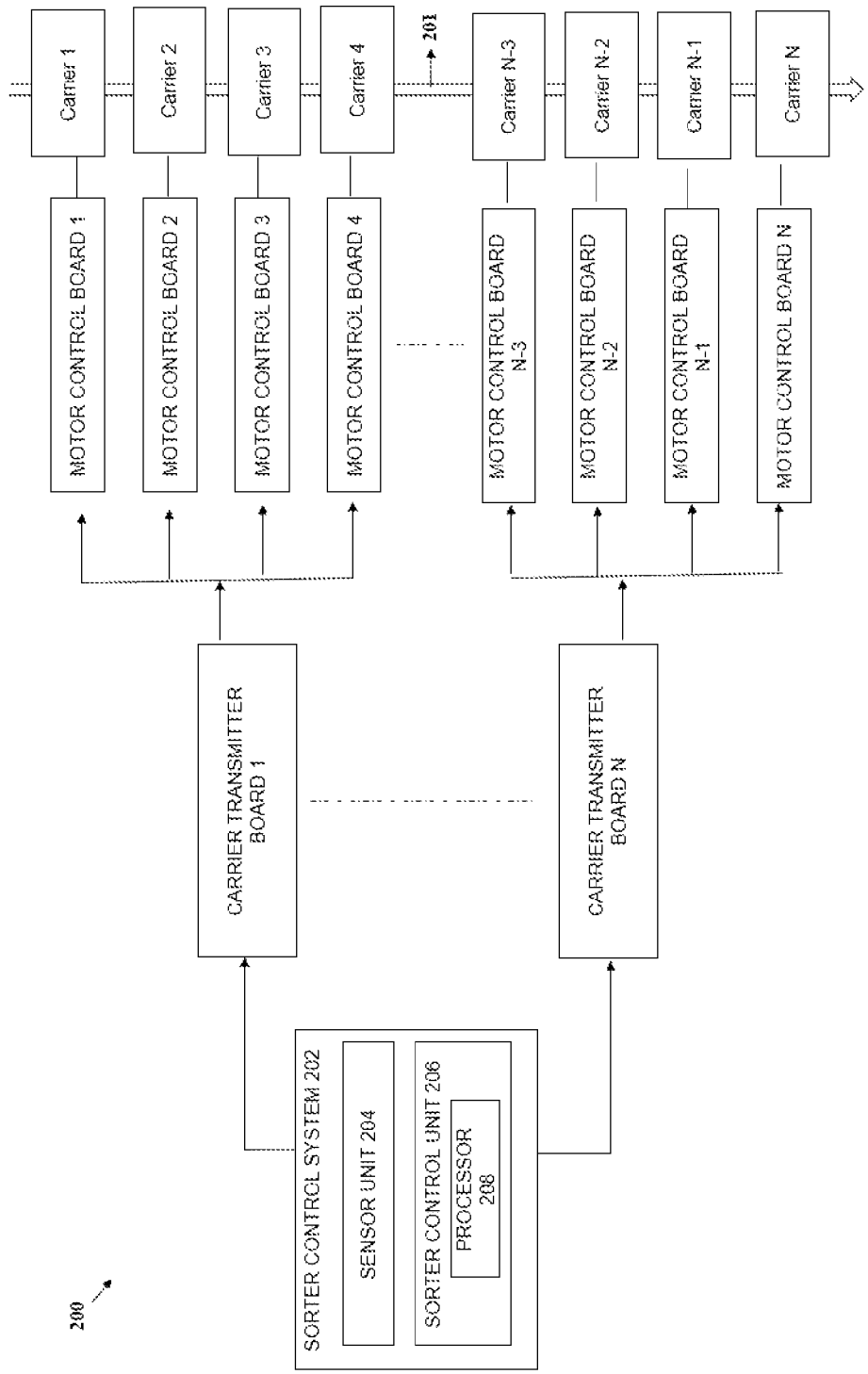
FIG. 2 illustrates a schematic view of a sortation system, in accordance with some example embodiments described herein.

FIG. 2 illustrates another schematic view of an example sortation system 200, in accordance with some example embodiments described herein. Illustratively, the sortation system 200 can comprise a sorter control system 202, a plurality of CTBs, and a plurality of MCBs. As illustrated, the sorter control system 202 that can be communicatively coupled to a plurality of CTBs (CTB 1 . . . CTB N) over a communication network (e.g. the communication network 108). The sorter control system 202 can include a sensor unit 204 and a sorter control unit 206 that can be auto calibrated, by way of implementation, of various example embodiments described herein. The sorter control unit 206 can further include a processor 208.

According to an example embodiment, the sorter system 200 can represent an example installation of a sorter (e.g. a tilt-tray sorter or a cross belt sorter) in a material handling environment. In an example, the sorter system 200 can include multiple CTBs that can be positioned (e.g. mounted) at various pre-defined locations along a sorter 201 of the sorter system 200. For example, these CTBs can be mounted nearby an induct or an item discharge chute connected to primary conveyor bed, or at any pre-defined location of the sorter 201. The CTBs can be communicatively coupled to the sorter control system 202. In some example embodiments, the CTBs can receive commands from the sorter control system 202. In some examples, the sorter control system 202 can track position of each carrier of the sorter using the sensor unit 204 and can further communicate commands (e.g. an article discharge command) including position information of the respective carriers (carrying the article) to the CTBs.

In some example embodiments, the sensor unit 204 can correspond to a clock pulse unit comprising light sensors (e.g. photo eyes) that can be used to track movement of each carrier of the sorter 201 as it passes through a section monitored by the sensor unit 204. More details of the sensor unit 204, in accordance with some examples, are described in reference to FIG. 6.

As illustrated, each CTB can be communicatively coupled to a set of MCBs from amongst a plurality of MCBs of the sortation system 200. In this regard, in some examples, the sorter 201 can include multiple carriers (Carrier 1, Carrier 2 . . . Carrier N) each associated with one or more motor control boards (MCBs). The carriers may be configured to carry items and perform handling of the items. For instance, in an example, the sorter 201 can be a tilt-tray sorter and the carriers (Carrier 1, Carrier 2 . . . Carrier N) can correspond to tilt-tray carriers. In this regard, each tilt-tray carrier of the tilt-tray sorter can operate based on commands from the MCB that is associated with the tilt-tray carrier. For example, the MCB can generate a command to actuate a motor that can cause tilting of a tray coupled to the tilt-tray carrier to discharge an item placed on the tilt-tray carrier. In this regard, in some examples, the MCB can generate the commands, in response to, commands that may be received from the CTB to which the MCB can be communicatively coupled. For example, CTB 1 can be communicatively coupled to MCB 1, MCB 2, MCB 3, and MCB 4 of the sortation system. Said that, the MCB 1, MCB 2, MCB 3, and MCB 4 can receive commands from the CTB 1. Said that, such commands from the CTB to the MCB can be transmitted at an appropriate or predefined time period. For example, the CTB 1 can send a command to discharge an item on the Carrier 2. The command can be received at the MCB 2 at an instance of time when a carrier of the MCB is in front of a chute or induct, at which the Carrier 2 is to discharge the item. In this regard, the CTB generates the command based on estimating a position of the carrier at a time when the carrier has to discharge the item. In some examples, the sorter control system 202 can perform estimation of the position of the carrier at any time instance, which can be further received by the CTB to generate the command for the MCB. Alternatively, in some examples, the CTB can estimate a current position of the carrier at any instance of time based on the position information of the carriers tracked by the sensor unit 204 of the sorter control system 202. Accordingly, the CTB can generate the command to the MCB.

In accordance with some example embodiments, the sorter control unit 206 can be auto calibrated. Auto-calibration referred herein, may involve calibrating one or more components of the sorter control unit 206 for various parameters. For instance, in an example embodiment, the auto-calibration may involve calibrating at least one of a position information of a carrier of the sorter 201 and/or the CTB from the sorter control system 202. In some examples, the calibration may include modifying initial estimates of position information of the CTBs and/or the carriers of the sorter based on a clock offset value identified during the auto-calibration. As described earlier, the position information of each carrier of the sorter 201 can be determined by the processor 208 via the sensor unit 204. Further, this position information can be shared by the sorter control unit 206 to the CTBs. Furthermore, the CTBs can transmit a short discharge command to a first section of the sorter 201 based on the position information. The position information of each carrier of the sorter 201 can be measured in terms of clock cycles. In this regard, the auto-calibration may include adjusting the position information measured in the clock cycles based on a clock offset. According to an example embodiment, the short discharge command can correspond to a command for discharging an item from a carrier section of the sorter 201. In an example, the short discharge command can be destined for a first MCB (e.g. the Motor control board 1) associated with a corresponding carrier (i.e. Carrier 1) of the sorter 201. In an example, the short discharge command generated by the CTB can be based on a first clock offset. The first clock offset can correspond to an offset value by which a clock cycle value can be modified. In this regard, as described earlier, the CTB can generate the commands to the MCB based on (a) an estimated position of the carrier of the MCB which is measured in clock cycles and (b) using the clock offset values. Further, the processor 208 of the sorter control unit 206 can be configured to identify if a status message is received at the CTB. In an example, the status message can be received at the CTB in response to the short discharge command generated by the CTB. According to some examples, the status message can correspond to a message (e.g. an acknowledgement) that can be received from any MCB of the plurality of MCBs that receives the short discharge command. To this end, in some examples, the processor 208 and/or the CTB can periodically and/or continuously perform monitoring (e.g. polling) with the MCBs to identify if a response (i.e. the status message) to the short discharge command is received from any of the plurality of MCBs of the sorter system 200. Further, based on receiving of the status message, the processor 208 can identify if the short discharge command was received at the first MCB (i.e. the MCB to which the short discharge command was destined by the CTB) or any other MCB of the sorter 201. In other words, based on sender (i.e. the MCB) of the status message the processor 208 can identify if the short discharge command transmitted by the CTB was received at the first MCB to which the short discharge command was destined or not received at the first MCB. According to various examples described herein, the status message can either indicate that the short discharge command is received at the first MCB (i.e. intended MCB). Alternatively, the status message can be used by the processor 208 to identify that the short discharge command is not received at the first MCB, rather was received at another MCB (e.g. a second MCB).

In accordance with some example embodiments, in response to the status message indicating that the first MCB received the short discharge command, the processor 208 can configure the sorter control system 202 of the sorter 201 based on the first clock offset. In this regard, configuration of the sorter control system 202 can involve setting up a clock offset value used for estimating position information of each carrier of the sorter 201, as the first clock offset value. Further details of configuration of the sorter control system 202 are described in reference to FIGS. 3-8.

Further, in accordance with various example embodiments described herein, in response to the status message indicating that the first motor control did not receive the short discharge command, the processor 208 can modify the first clock offset to a second clock offset. Furthermore, the processor 208 can cause the CTB to retransmit the short discharge command based on a second clock offset. The second clock offset referred herein can correspond to clock offset value that can be computed based on modifying the first clock offset. In this regard, in an example, the processor 208 can modify the first clock offset to the second clock offset based on increasing the first clock offset by a first pre-determined value. In another example, the processor 208 can modify the first clock offset to the second clock offset based on decreasing the first clock offset by a second pre-determined value. As an example, in one round, the processor 208 can modify the first clock offset value by increasing or decreasing the first clock offset value by two clocks. Further, in next round, the processor 208 can modify the first clock offset value by increasing or decreasing the first clock offset value by four clocks and so on. Accordingly, the processor 208 can continue to modify the first clock offset as to reach to a value based on which the short discharge command transmitted by the CTB reaches the first MCB. In this regard, in accordance with various example embodiments described herein, the processor 208 and/or the CTB can again periodically and/or continuously perform monitoring (e.g. polling) with the MCBs to identify the status message, in response to the short discharge command transmitted based on the second clock offset is received from the MCB. Accordingly, the processor 208 can perform modification to the clock offset values until, the status message is received from the MCB to which the short discharge command is destined. Further, based on the clock offset value at which the short discharge command reaches the first MCB, the sorter control system 202 can be configured.

According to some example embodiments, the short discharge commands can be transmitted by the CTB based on a pre-defined transmit window. In this regard, in some examples, the pre-defined transmit window for transmitting the short discharge command can also be modified during the auto-calibration. Further, in some examples, multiple short discharge commands can be generated for multiple MCBs selected randomly by the processor 208. In this regard, the multiple short discharge command can be generated using different clock offsets. Further, as described for single carrier, the clock offset value used for each short discharge command can be modified until the short discharge command is received at the carrier to which it is destined.

By way of implementation, the sorter control system 202 can be calibrated for accurate sorter PLC offset values without requiring any additional hardware or manual calibration. Further, as the calibration can be performed automatically by the processor 208 of the sorter control system 202, a time required during sorter commissioning can be reduced, thereby, contributing to improved sorter performance.

Figure 3:
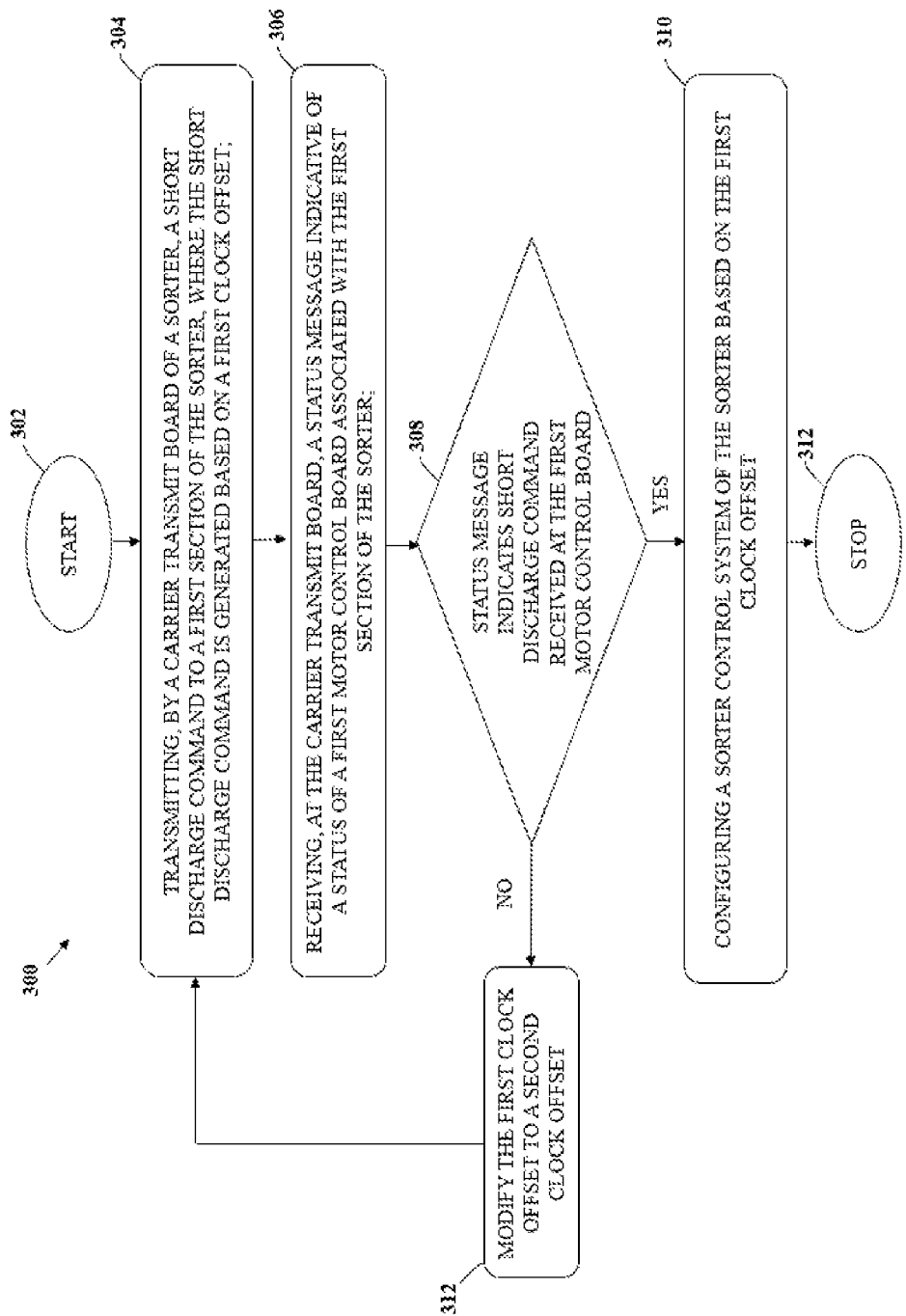
FIG. 3 illustrates an example flowchart representing a method of configuring a sorter control system of a sortation system, in accordance with some example embodiments described herein.
Figure 4:
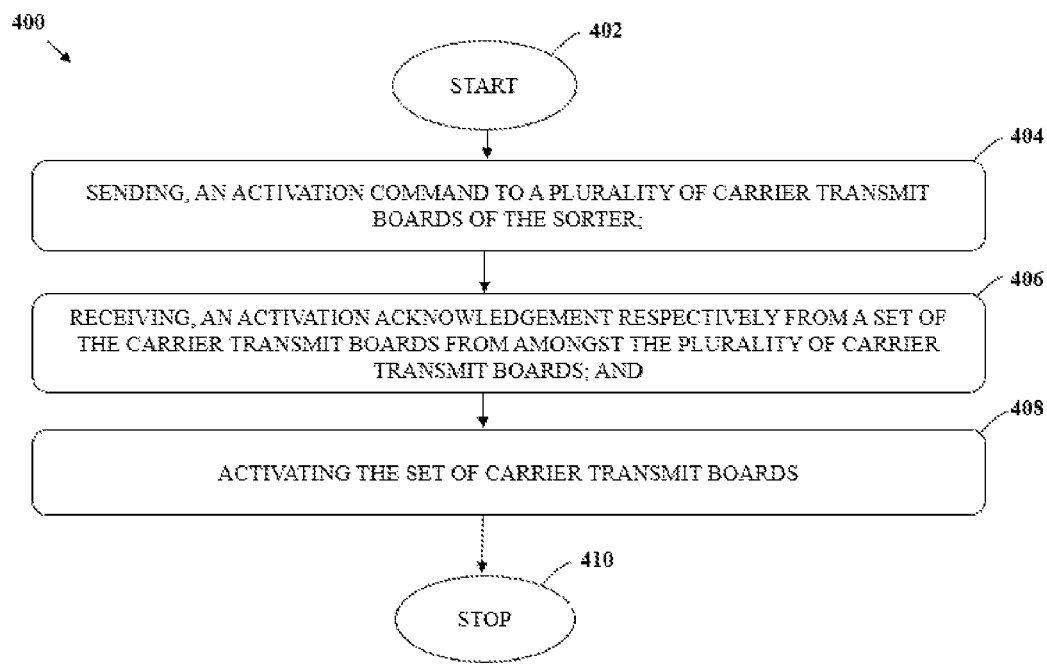
FIG. 4 illustrates an example flowchart representing a method of activating a carrier transmit board of a sortation system, in accordance with some example embodiments described herein.

FIG. 3 illustrates an example flowchart representing a method 300 of configuring the sorter control system 202 of the sorter system 200, in accordance with some example embodiments described herein. Further, FIG. 4 illustrates an example flowchart representing a method 400 of activating a CTB of the sorter system 200, in accordance with some example embodiments described herein.

It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for the implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block (s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 3 through 4, when executed, convert the computer or processing circuitry into a particular machine configured to perform an example embodiment of the present invention. Accordingly, the operations of FIGS. 3 through 4 can define an algorithm for configuring a computer or processor, to perform an example embodiment. In some cases, a general-purpose computer may be provided with an instance of the processor which performs the algorithm of FIGS. 3 through 4 to transform the general-purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

The method 300 of configuring the sorter control system 202 of the sorter system 200, is illustrated in FIG. 3. Illustratively, the method 300 starts at step 302. At step 304, the sorter system 200 may comprise means such as, the processor 208 to cause, via the CTB, a transmission of a short discharge command to a first section of the sorter 201. In an example, the short discharge command can be transmitted by the CTB (e.g. the CTB 1) of the sorter 201. In an example, the short discharge command generated by the CTB can be transmitted towards the first section (e.g. MCB 1 associated with the Carrier 1). The CTB can generate the short discharge command based on a first clock offset. In this regard, in some examples, the CTB may receive an estimate of the position information of the Carrier 1 from the sorter control system 202. The estimate of the position information may indicate a position of the Carrier 1 from the CTB at one time instance. The position can be measured in terms of a number of clock cycles of the sorter control system 202. In this regard, the CTB can transmit the short discharge command based on using the estimate of the position information and adjusting the position based on the first clock offset. The short discharge command can be transmitted by the CTB for the first MCB of the sorter 201.

At step 306, the sorter system 200 may comprise means such as, the CTB to receive a status message. According to an example embodiment, the status message can be indicative of a status of an MCB associated with a section (e.g. carrier) of the sorter 201. In some examples, the status may indicate if the MCB received the short discharge command transmitted by the CTB. Said that, in some examples, the status message may be received in response to the short discharge command transmitted by the CTB. The status message can be received from any MCB of the plurality of MCBs of the sorter system 201. In an example, the status message may be received form the first MCB (i.e. MCB 1) of the sorter system 201, in response to receiving of the short discharge command. In another example, the status message may be received from the second MCB (i.e. MCB 2) of the sorter system 201. In other words, the status message may be received from the MCB that receives the short discharge command from the CTB.

At step 308, the sorter system 200 may include means such as the processor 208 to identify if the short discharge command is received at the first MCB. Here the first MCB can correspond to that of the sorter 201 to which the CTB intended to transmit the short discharge command. In other words, it may so happen that the CTB transmits the short discharge command to the first MCB, however, the short discharge command is received by the second MCB due to inaccuracy in the calibration of the sorter control system 202. Accordingly, at step 308, the processor 208 may identify such an inaccuracy, by using the status message which can indicate that the short discharge command is received or not received at the first MCB.

The method 300 moves to step 310, in case it is identified by the processor 208 that the short discharge command is received at the first MCB. Further, at step 308, the processor 208 can configure the sorter control system 202 based on the first clock offset. Said differently, the processor 208 can adjust estimates of the position information determined by the sensor unit 204 based on tracking of all the carriers of the sorter 201, by a factor of the first clock offset.

Alternatively, in some instances, at step 310, it may be identified by the processor 208 that the short discharge command is not received at the first MCB, rather, the short discharge command is received at an MCB other than the first MCB. In such case, the method moves to step 312. At step 312, the processor 208 can modify the first clock offset to the second clock offset. In this regard, as described earlier, modification of the first clock offset can be based on increasing or decreasing of the first clock offset by a predetermined value. The method can further move back to step 304, at which the processor 208 can cause transmission of the short discharge command based on the second clock offset. In other words, after the step 312, the steps (304-308) can be repeated to modify clock offset value used for generating the short discharge command until, the processor 208 identifies the clock offset value at which the short discharge command is received at the first MCB. Accordingly, the processor 208 can configure the sorter control system 202 using the clock offset value at which the short discharge command is received at the first MCB.

FIG. 4 illustrates an example flowchart representing a method 400 of activating a CTB of the sorter system 200, in accordance with some example embodiments described herein. As described earlier, the sorter system 200 can include a plurality of CTBs (CTB 1 . . . CTB N). In an example, the CTBs can be positioned along the sorter 201 at various predefined locations. According to some example embodiments, the sorter control system 202 can cause activation of one or more of the plurality of CTBs of the sorter 201. In this regard, the CTBs upon activation can initiate communication with one or more MCBs associated with carriers of the sorter 201. For instance, in some examples, the steps of method 300 can be performed upon activation of a set of CTBs of the sorter system 200. In accordance with various example embodiments described herein, the CTBs can be activated by the sorter control system 202 to initiate transmission of a command (e.g. the short discharge command) to the MCBs associated with carriers of the sorter 201. In one example, a PLC of the sorter control system 202 can activate the CTBs based on clock offset values for which the sorter control system 202 is calibrated. In some examples, the sorter control system 202 can also share position information of the one or more carriers of the sorter 201 with the CTBs during the activation of the CTBs.

The method 400 starts at step 402. At step 404, the sorter control system 202 can include means such as, the processor 208 to send an activation command. The activation command can be sent to the plurality of CTBs (CTB 1 . . . CTB N) of the sorter 201. Further, at step 406, in response to the activation command, the processor 208 can receive an activation acknowledgement. The activation acknowledgement can be received respectively from a set of CTBs from amongst the plurality of CTBs of the sorter 201. In this regard, the set of CTBs can correspond those CTBs that received the activation command from the processor 208. Moving to step 408, the processor 208 can activate the set of the CTBs from which the activation acknowledgement is received. In this regard, in some example embodiments, the sorter control system 202 can activate those CTBs which receives the activation command and responds with the acknowledgement.

FIG. 5 illustrates an example result set including a plurality of clock offset values identified for configuration of the sorter control system 202 by performing the auto-calibration, in accordance with some example embodiments described herein. Illustratively, column A (marked as 502) depicts an identification number of each carrier of the sorter 201. As described earlier, the sorter 201 can include multiple carriers and any number of CTBs. For instance, in one example, the sorter 201 can include four hundred carriers and three hundred CTBs. In this regard, each carrier of the sorter 201 can be identified by an identification number as depicted in column A. Illustratively, column B (marked as 504) and column C (marked as 506) depicts initial estimated position values for each carrier of the sorter 201 and a clock offset value for that carrier that may be computed by the sorter control system 202. To this end, each value in column B can represent a number of clock cycles at which that carrier is estimated to be positioned from the sorter control system 202. Further, each value of column C represents an initial clock offset value that is to be added to the value of column B to determine exact position of the carrier from the sorter control system 202 which can be used by the CTB to send a discharge command to the MCB. As described earlier, in accordance with various example embodiments described herein, a position of each carrier of the sorter 201 can be stated in terms of clock cycles from the sorter control system 202. In this regard, the clock offsets can be added to the clock cycles to determine exact position of the carrier. For example, for a carrier with identification number '255', the exact position of the carrier from the sorter control system 202 can be referred as 250 (i.e. 240+10) clock cycles. Illustratively, columns D (marked as 508) and E (marked as 510) depicts values (i.e. clock cycles) of the carrier and the offsets respectively, that can be derived based on performing one round of auto-calibration of the sorter control system 202. Further, column F (marked as 512) and column G (marked as 514) depicts values of the carrier and the offsets respective, that can be derived based on performing two rounds of auto-calibration. In an example, the auto-calibration can be performed based on the method 400 as described in FIG. 4. Illustratively, columns D-G depict some modifications in the clock values compared to initial estimates. For instance, as an example, for carrier with identification number 270, the clock offset value is modified to '11' compared to initial estimate of '8' clock cycles. Accordingly, in some example embodiments, the sorter control system 202 can be configured based on the clock values and clock offset values (as illustrated in columns D-G) that can be derived upon performing auto-calibration. In this regard, in some examples, a clock offset value identified for configuring the sorter control system 202, by performing the auto-calibration, can be provided by a user input to configure the sorter control system 202.

Figure 6:
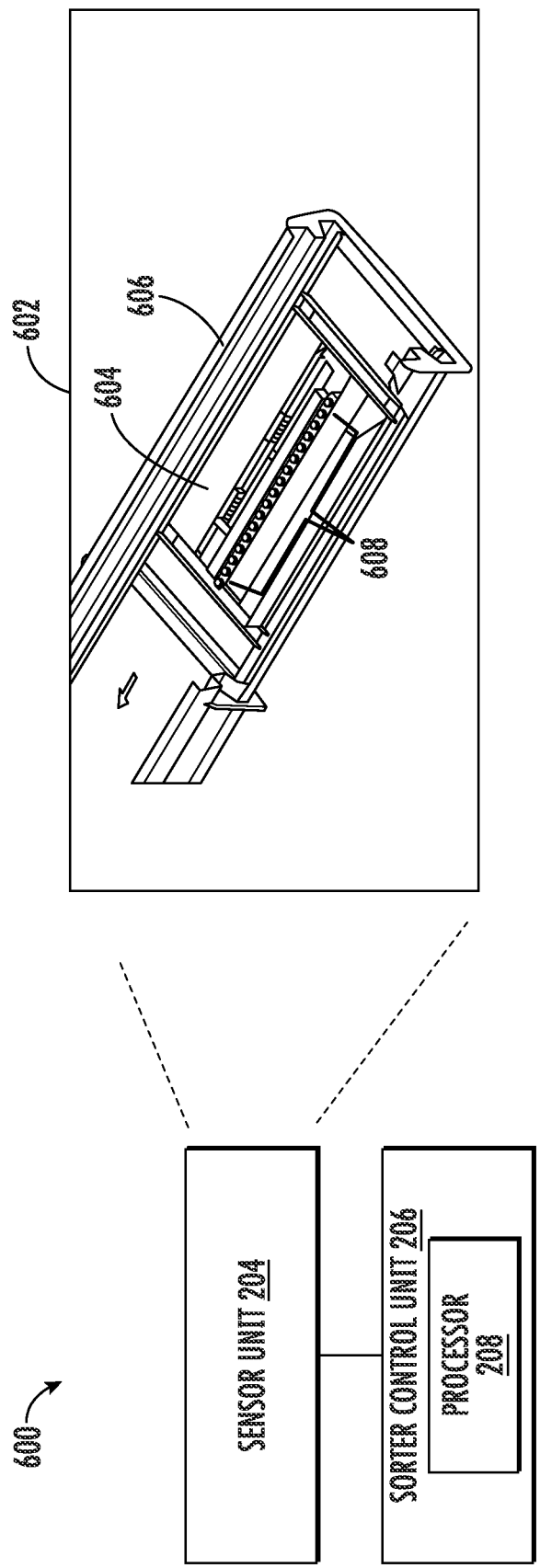
FIG. 6 illustrates a schematic view of a Clock Pulse Unit of a sorter control system, in accordance with some example embodiments described herein.

FIG. 6 illustrates a schematic view of the sensor unit 204 of the sorter control system 202, in accordance with some example embodiments described herein. As described earlier, the sensor unit 204 can be used for tracking position of each carrier of the sorter 201. FIG. 6 also illustrates, a view 602 that depicts a section 604 of the sorter 201 having a clock pulse unit 606. According to an example embodiment, the clock pulse unit 606, as illustrated in FIG. 6, can correspond to a perspective view of the sensor unit 204, as described in FIG. 2.

In some example embodiments, the clock pulse unit 606 can include a plurality of photocells 608 that can be mounted on a bracket. For instance, in one example, the clock pulse unit 606 can include sixteen (16) or twenty-four (24) clock pulse photocells that can be placed in a series at a pre-defined spacing apart. In an example, the clock pulse photocells can be placed 50 mm apart. The spacing at which the clock pulse photocells are separated can correspond to one clock pulse and can be used for calculating the position information of each carrier of the sorter 201, in terms of clock cycles. For example, for a carrier of length 600 mm, the sensor unit 204 having the photocells spaced 50 mm apart, can record 12 clock pulse values, as the carrier passes through the section 606 of the sorter 201. Further, the section 606 of the sorter can include a strip of reflective tape that can mounted opposite the photocells. The reflective tape can reflect photocells' visible red light. According to an example embodiment, the clock pulse photocells can be configured so that an output signal is 'OFF' when there is no object blocking a view of the reflector. Further, each time a carrier of the sorter 201 passes the clock pulse unit 606, a clock pulse photocell is dimmed (the light from the reflector is blocked) by a sensing object or flag on the carrier. Accordingly, an output signal of the photocells is 'ON' when the photocell is dimmed. In this manner, the clock pulse unit 606 can count the clock cycles and track passing of each carrier of the sorter 201. In some examples, the clock pulse unit 606 can operate as an encoder device that can be configured to track each carrier of the sorter 201, as the carrier passes through the section 604. Further, the clock pulse unit 606 can provide information pertaining to tracking of each carrier of the sorter 201 to the sorter control unit 206. The sorter control unit 206 can use the information to compute the position information or an estimate of the position information for each carrier of the sorter 201, at all instances of time. Said that, in accordance with various example embodiments described herein, a 'clock offset value' determined for auto-calibration of the sorter control system 202, as described at various instances throughout the description, can correspond a number of clocks from the sensor unit 204 to each CTB of the sorter 201.

Figure 7:
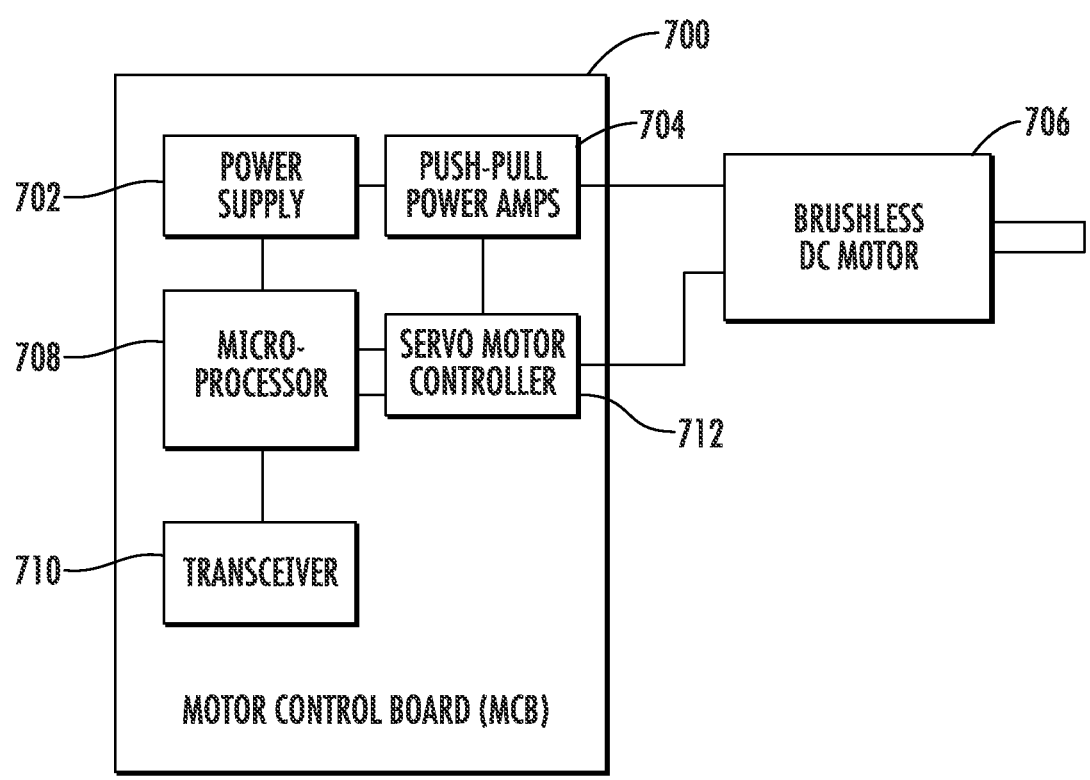
FIG. 7 illustrates a schematic view of a motor control board of a sortation system, in accordance with some example embodiments described herein.

FIG. 7 illustrates a schematic view of a motor control board 700 of the sorter system 200, in accordance with some example embodiments described herein. In accordance with various example embodiments described herein, each carrier of the sorter 201 can have an associated MCB. Further, as described earlier, the MCB can receive one or more commands from any CTBs of the sorter system 200 to discharge items carried by the carriers to which the MCB is associated. In some example embodiments, as illustrated, the MCB 700 can include a power supply 702. In some examples, the power supply 702 can regulate the low voltage power for electronics and pre-amplifies for power amps 704 which can power windings of a motor 706 of the carrier. In the embodiment depicted, the motor 706 can be a brushless DC motor. In some examples, the MCB 700 can include a microcontroller 708. In some examples, the microcontroller 708 can include, a central processing unit, a flash memory, a static RAM memory, an EEPROM, a universal asynchronous receive/transmitter block, a position sense block, and current sense block, and a pulse width modulator. In some examples, the MCB 700 can also include a transceiver 710 (e.g. an infra-red receiver/transmitter opto-electronics) and a servo carrier discharge control 712, which can commutate power amps 704 sequentially to cause the motor 706 to rotate in a desired angular direction and/or speed. In some examples, actuation of the motor 706 can initiate discharging of the item carried by the carrier to which the MCB 700 is associated. In some examples, as described earlier, the MCB 700 can receive a discharge command from a CTB of the sorter system 200 and can accordingly actuate the motor 706.

Figure 8:
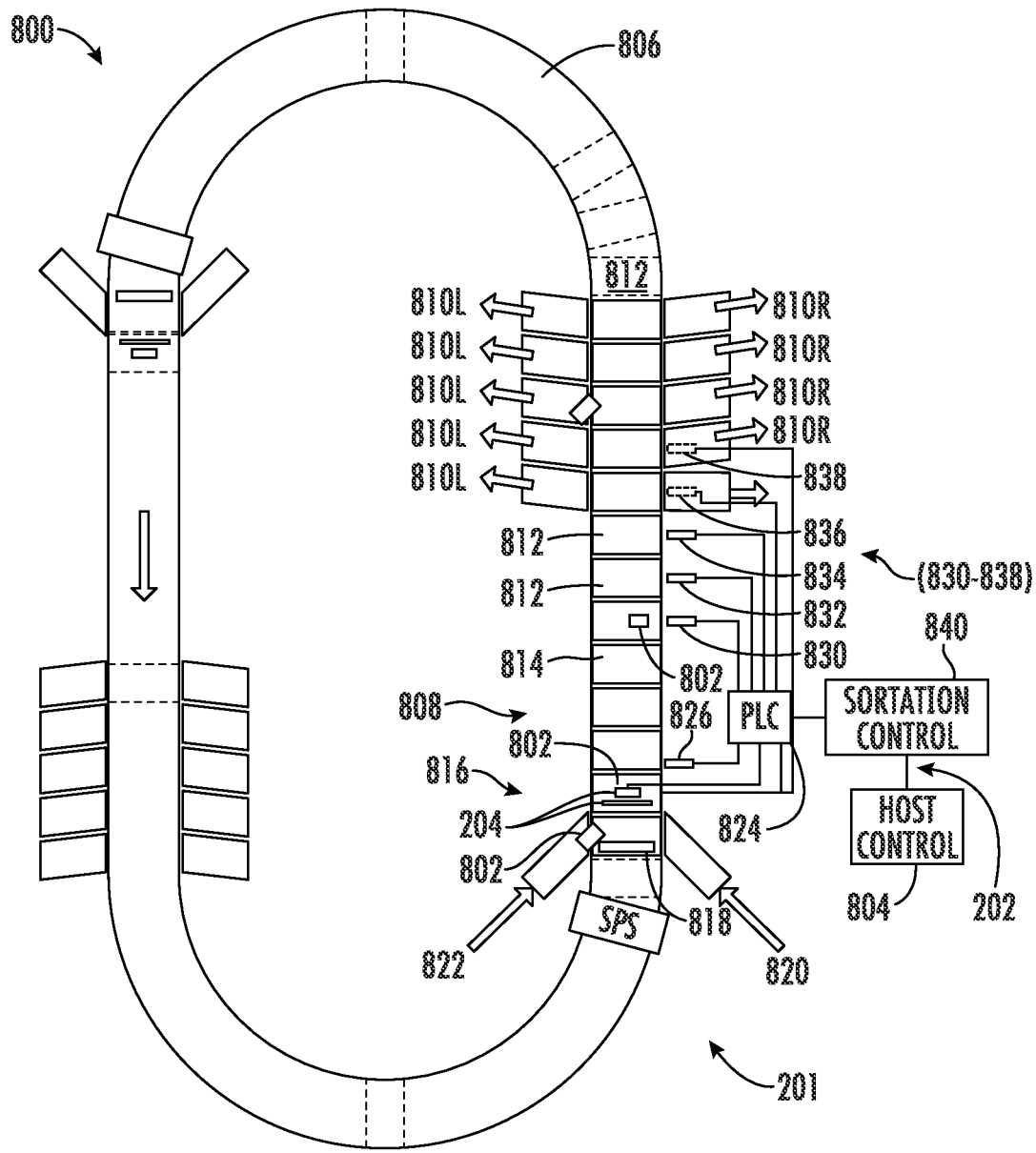
FIG. 8 illustrates an example of a sorter comprising a sorter control system for configuration, in accordance with some example embodiments described herein.

FIG. 8 depicts an example illustration of a sorter system 800 comprising the sorter control system 202 that can be configured, in accordance with some example embodiments described herein. In some examples, the sorter system 800 can correspond to the sorter system 200 as described in reference to FIG. 2. Illustratively, the sorter system 800 can include the sorter 201 that can sort articles 802 received from a material handling system. In some examples, the sorter 201 can be connected to a host control 804 of the material handling system. In some example embodiments, the sorter 201, as diagrammatically represented in FIG. 8 can be of an oval shape 806, having an endless conveyor 808. In some examples, the endless conveyor 808 can move at a constant speed in a direction such as counterclockwise as indicated by the direction of travel arrows on the oval. In an example, the endless conveyor 808 can be flanked by a plurality of discharge locations 810L, 810R that can be stationary thereto, and can include the discharge locations 810L, 810R at more than one side of the oval shape 806. According to some example embodiments, the endless conveyor 808 can comprise a plurality of carriers 812 that can be linked together with a conveying surface 814 on each carrier 812, for conveying an article 802 placed thereon. In an example, a carrier 812 can receive an article 802 from an induction and can further discharge the article 802 into a selected one of the stationary lateral discharge locations 810L, 810R at a specified time. In this regard, as the endless conveyor 808 moves, after induction, a location of the article can be anywhere on the conveying surface 814.

In an example embodiment, the sorter system 800 can include an item detection system 816. In this regard, the article 802 on the conveying surface 814 can be scanned with the item detection system 816. According to some examples, the item detection system 816 can correspond to the sensor unit 204 of the sorter system 200. In this regard, scanning of the article 802 can be performed using one or more sensors of the sensor unit 204. According to some example embodiments, to deliver the article 802 to the selected one of discharge locations 810L, 810R, a processor (e.g. the processor 208) of the sorter system 800 can use information from the sensor unit 204 to calculate an estimated position of the carrier 812, in terms of clock cycles, at any instance of time. Further, the processor 208 can communicate the estimate of the position information of the carrier 812 carrying the article 802 to a CTB of the sorter system 800. In this regard, the sorter system 800 can include a plurality of CTBs that can be positioned at various locations along the sorter 201. For instance, the sorter system 800 can have CTBs (830-838), as illustrated in FIG. 8. Similar to as described earlier in reference to FIGS. 1-2, each CTB of the sorter system 800 can include a communication circuit having a transmitter that can facilitate communication amongst the CTB, the sorter control system 202, and one or more MCBs of the sorter 201. In an example embodiment, based on the position information received from the processor 208, the CTB can transmit a short discharge command to the MCB (not shown) associated with the carrier 812 to discharge the article 802.

In some example embodiments, the processor 208 of the sorter system 800 can calculate a compensating time-to-intercept point for the CTB at which the CTB can send a command to an MCB associated with the carrier 812. In some examples, the command can correspond to a short discharge command to discharge the article 802 from any position on the conveying surface 814 of the carrier 812 into the selected one of discharge locations 810L, 810R. In some examples, the processor 208 can calculate a compensating time-to-intercept point (or release point) to place the article 802 on a discharge trajectory based on at least one of: the location information of the carrier 812, the direction of article discharge, the longitudinal speed of the endless conveyor 808, and lateral speed of the conveying surface 814. Accordingly, at an appropriate time (interception point), the CTB can send the short discharge command to the MCB to initiate one discharge movement of the conveying surface 814 to discharge the article 802 into the selected one of discharge locations 810L, 810R. According to some examples, in response to receiving the short discharge command, the MCB associated with the carrier 812 can initiate discharge of the article 802 by placing the article 802 into a selected one of the discharge locations 810L, 810R.

According to some example embodiments, the sorter system 800 include an endless conveyor 808 of the carriers 812 of the sorter 201 corresponding to a cross-belt sorter. In this regard, in an example, the conveying surface 814 of each carrier 812 can comprise a conveyor belt oriented to discharge articles 802 crosswise or at a right angle to the direction of travel. According to another exemplary embodiment, the sorter system 800 include an endless conveyor 808 of carriers 812 of the sorter 201 such as, a tilt-tray sorter. In this regard, each carrier 812 can include a tray section that can be tilted based on an actuation of the MCB of the carrier 812 to discharge the articles 802.

In accordance with various example embodiments described herein, each carrier 812 of the sorter 201 can include a carrier discharge control (e.g. an MCB as described in reference to FIGS. 1, 2, and 7). In some examples, the MCB (not shown in FIG. 8) can be located on a frame of the carrier 812. In some examples, the MCB can be associated with any portion of the carrier 812. As described earlier, the MCB can include a processor that can receive discharge commands from the CTBs and can initiate the discharge of the article 802 at the appropriate time while the carrier 812 is moving. In this regard, as described in reference to FIG. 7, the MCB can include a motor control that can actuate on command one or more motors or other elements of the carrier 812 to discharge the article 802 therefrom.

In an example embodiment, the sorter system 800 can receive articles 802 from the material handling system, via the induction 818. In some examples, as illustrated, the induction 818 can induct articles onto endless conveyor 808 with any of an overhead merge, or an angle merge 820, 822. Said that, according to some examples, the item detection system 816 can be located downstream from the induction 818 and can scan the carriers 812, as the carriers 812 passes thereby. As described earlier, the item detection system 816 can correspond to the sensor unit 204. In some examples, the sensor unit 204 can include multiple photo eyes to track the carriers 814 as the carriers move through a section monitored by the sensor unit 204.

According to some example embodiments, the sorter system 800 can include a PLC 824. The PLC 824 can be communicatively coupled to the sensor unit 204. In some examples, the PLC 824 can compute the position information of the carriers 814 at any time instance based on tracking of the carriers 814 as performed by the sensor unit 204. In some examples, the PLC 824 can correspond to any component of the sorter control unit 206, as described in reference to FIG. 2. In some examples, the PLC 824 can translate the position information into a form that can be sent, via a transmitter 826, to the one or more CTBs (830-838) of the sorter system 800, for further use. In some examples, based on receiving the position information from the PLC 824, the CTBs (830-838) can communicate to one or more MCBs, an item discharge command that may include information, as off-center values such as an X axis deviation and a Y axis deviation from a conveying surface reference point, to the MCB of the corresponding carrier 812.

For instance, in an example, the CTB 830 can store the position information received from the PLC 824 and can transmit a discharge command of "discharge left" or "discharge right" to the MCB associated with the carrier 812 to place the article 802 into the selected one of the discharge locations 810L, 810R. In some examples, the discharge command can be generated at the PLC 824 end itself. In this regard, the PLC 824 can generate the discharge command and can communicate it to the CTBs (830-838) which in turn can forward the discharge command to desired MCBs.

In some example embodiments, the discharge command can be generated based at least in part on information received from a sortation control 840 and the host control 804. In some examples, the host control 804 can provide the PLC 824 with a map of which discharge location 810L, 810R that article 802 is to be discharged into after induction, and identification of the article on the sorter 201. In some examples, article weight, article volume, and article shape can be taken into consideration by the host control 804. In accordance with some example embodiments, the sortation control 840 can provide unified operational control and alarm surveillance for subsystems that make up the sorter 201. In some examples, the sortation control 840 can also make routing decisions for the article 802 based on information provided by the host control 804.

According to some example embodiments, the sorter system 800 can include a plurality of stationary discharge locations 810L, 810R that can be positioned downstream from the shown on both sides of the oval 806. In some examples, the discharge locations 810L, 810R can receive articles 802 from the endless conveyor 808 and can discharge the articles. According to some examples, the pluralities of discharge locations 810L, 810R can also correspond to chute banks, e.g. chutes that can collect the articles. Although the sorter system 800 illustrates the sorter 201 as a double-sided sorter, one sided sorters and configurations without aligned left and right-side discharge locations may be used.

Generally, applications (e.g., program modules) can include routines, programs, components, data structures, etc., described herein in accordance with example embodiments, that can perform tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

According to some example embodiments, the sorter system 200 can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

According to some example embodiments described herein, a communication media typically embodies computer-readable instructions, data structures, program modules or other data in a modulated data signal such as a carrier wave or other transport mechanism and includes any information delivery media. In this regard, the term "modulated data signal" can correspond to a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

According to said example embodiments, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

In accordance with some example embodiments, computing devices typically include a variety of media, which can include computer-readable storage media or communications media, which two terms are used herein differently from one another as follows.

According to some example embodiments, a computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be a localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

It may be noted that, as used in this specification and the appended claims, the singular forms "a," "an" and "the" comprise plural referents unless the content clearly dictates otherwise.

References within the specification to "one embodiment," "an embodiment," "embodiments", or "one or more embodiments" are intended to indicate that a particular feature, structure, or characteristic described in connection with the embodiment is comprised in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

Detailed embodiments are disclosed herein; however, it is to be understood that the disclosed embodiments are merely exemplary, which may be embodied in various forms. Therefore, specific structural and functional details disclosed herein are not to be interpreted as limiting, but merely as a basis for the claims.

While it is apparent that the illustrative embodiments described herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. A method for auto-calibration of a sorter, the method comprising:

tracking, by a sensor unit communicatively coupled to a carrier transmit board of a sorter, movement of each carrier of a first section of the sorter;

transmitting, by the carrier transmit board of the sorter, a short discharge command to the first section of the sorter, wherein the short discharge command is generated based on a first clock offset, wherein the first clock offset describes a position estimate of the first section of the sorter based on tracked movement of each carrier of the first section of the sorter;

in response to the transmitting of the short discharge command, receiving at the carrier transmit board a status message indicative of a status of a first motor control board associated with the first section of the sorter;

in response to the status message indicating that the first motor control board did not receive the short discharge command, modifying the first clock offset to a second clock offset and retransmitting, by the carrier transmit board, the short discharge command based on a second clock offset, wherein the second clock offset describes a modified position estimate of the first section of the sorter; and in response to the status message indicating that the first motor control board received the short discharge command, configuring a sorter control system of the sorter based on the first clock offset.

2. The method of claim 1, wherein the short discharge command is transmitted to the first motor control board associated with the first section of the sorter that is to be actuated for discharging an item.

3. The method of claim 2, wherein the first section of the sorter corresponds to one of: a carrier of a tilt-tray sorter or a cross-belt of a cross belt sorter.

4. The method of claim 1, wherein the short discharge command is transmitted based on a pre-defined transmit window defined for the carrier transmit board.

5. The method of claim 1, comprising:
sending, an activation command to a plurality of carrier transmit boards of the sorter;
receiving, an activation acknowledgement respectively from a set of carrier transmit boards from amongst the plurality of carrier transmit boards; and
activating the set of carrier transmit boards.

6. The method of claim 1, wherein modifying the first clock offset comprises one of:
increasing the first clock offset by a first predetermined value; and
decreasing the first clock offset by a second predetermined value.

7. A sorter system comprising:
a carrier transmit board;
a sensor unit communicatively coupled to the carrier transmit board, wherein the sensor unit is configured to track movement of each carrier of a first section of a sorter; and
a sorter control unit communicatively coupled to the carrier transmit board, the sorter control unit comprising a processor configured to:
transmit, by the carrier transmit board, a short discharge command to the first section of the sorter, wherein the short discharge command is generated based on a first clock offset, wherein the first clock offset describes a position estimate of the first section of the sorter based on tracked movement of each carrier of the first section of the sorter;
in response to transmitting of the short discharge command, identify a receiving of a status message at the carrier transmit board, wherein the status message is indicative of a status of a first motor control board associated with the first section of the sorter;
in response to the status message indicating that the first motor control board did not receive the short discharge command, modify the first clock offset to a second clock offset and retransmit, by the carrier transmit board, the short discharge command based on a second clock offset, wherein the second clock offset describes a modified position estimate of the first section of the sorter; and in response to the status message indicating that the first motor control board received the short discharge command, configure a sorter control system of the sorter based on the first clock offset.

8. The sorter system of claim 7, further comprising:
a plurality of motor control boards associated with respective item carrier sections of the sorter, the plurality of motor control boards comprising the first motor control board.

9. The sorter system of claim 7, wherein the short discharge command is transmitted to the first motor control board associated with the first section of the sorter that is to be actuated for discharging an item.

10. The sorter system of claim 9, wherein the first section of the sorter corresponds to a carrier of a tilt-tray sorter.

11. The sorter system of claim 9, wherein the first section of the sorter corresponds to a carrier of a cross belt sorter.

12. The sorter system of claim 7, wherein the short discharge command is transmitted based on a pre-defined transmit window defined for the carrier transmit board.

13. The sorter system of claim 7, wherein the processor is configured to:
send an activation command to the carrier transmit board;
receive an activation acknowledgement from the carrier transmit board; and
activate the carrier transmit board based on receiving of the activation acknowledgement.

14. The sorter system of claim 7, wherein the processor is configured to modify the first clock offset based on one of:
increasing the first clock offset by a first predetermined value; and
decreasing the first clock offset by a second predetermined value.

15. A computer program product comprising at least one non-transitory computer-readable storage medium having computer program code thereon that, in execution with at least one processor, configures the computer program product for:
tracking movement of each carrier of a first section of a sorter;
transmitting a short discharge command to the first section of the sorter, wherein the short discharge command is generated based on a first clock offset, wherein the first clock offset describes a position estimate of the first section of the sorter based on tracked movement of each carrier of the first section of the sorter;
in response to the transmitting of the short discharge command, receiving at a carrier transmit board of the sorter a status message indicative of a status of a first motor control board associated with the first section of the sorter;
in response to the status message indicating that the first motor control board did not receive the short discharge command, modifying the first clock offset to a second clock offset and retransmitting the short discharge command based on a second clock offset, wherein the second clock offset describes a modified position estimate of the first section of the sorter; and
in response to the status message indicating that the first motor control board received the short discharge command, configuring a sorter control system of the sorter based on the first clock offset.

16. The computer program product of claim 15, wherein the short discharge command is transmitted to the first motor control board associated with the first section of the sorter that is to be actuated for discharging an item.

17. The computer program product of claim 15, wherein the first section of the sorter corresponds to one of: a carrier of a tilt-tray sorter or a cross-belt of a cross belt sorter.

18. The computer program product of claim 15, wherein the short discharge command is transmitted based on a pre-defined transmit window defined for the carrier transmit board.

19. The computer program product of claim 15, wherein the computer program code thereon, in execution with the at least one processor, configures the computer program product for:

sending, an activation command to a plurality of carrier transmit boards of the sorter;
receiving, an activation acknowledgement respectively from a set of carrier transmit boards from amongst the plurality of carrier transmit boards; and
activating the set of carrier transmit boards.

20. The computer program product of claim 15, wherein to modify the first clock offset, one of the computer program code thereon, in execution with the at least one processor, configures the computer program product for:

increasing the first clock offset by a first predetermined value; and
decreasing the first clock offset by a second predetermined value.

* * * * *